United States Patent
Ray et al.

(10) Patent No.: US 11,493,620 B2
(45) Date of Patent: Nov. 8, 2022

(54) DISTRIBUTED MONOPULSE RADAR ANTENNA ARRAY FOR COLLISION AVOIDANCE

(71) Applicant: The Boeing Company, Chicago, IL (US)

(72) Inventors: Gary A. Ray, Issaquah, WA (US); Julio A. Navarro, Kent, WA (US)

(73) Assignee: The Boeing Company, Chicago, IL (US)

( * ) Notice: Subject to any disclaimer, the term of this patent is extended or adjusted under 35 U.S.C. 154(b) by 382 days.

(21) Appl. No.: 16/801,029

(22) Filed: Feb. 25, 2020

(65) Prior Publication Data

US 2021/0263139 A1     Aug. 26, 2021

(51) Int. Cl.
*G01S 13/44*     (2006.01)
*G01S 13/933*     (2020.01)

(52) U.S. Cl.
CPC ...... *G01S 13/4445* (2013.01); *G01S 13/4472* (2013.01); *G01S 13/933* (2020.01)

(58) Field of Classification Search
CPC .. G01S 13/4463; G01S 13/9092; G01S 13/44; G01S 13/4472; G01S 13/4445; G01S 13/4454; G01S 13/685; G01S 13/72; G01S 13/933; G01S 13/4481; G01S 13/87; G01S 13/934; H01Q 25/02; H01Q 3/2682
See application file for complete search history.

(56) References Cited

U.S. PATENT DOCUMENTS

| | | | | |
|---|---|---|---|---|
| 5,173,702 A | * | 12/1992 | Young | G01S 13/90 342/17 |
| 5,245,347 A | * | 9/1993 | Bonta | G01S 7/36 342/149 |
| 5,986,605 A | | 11/1999 | Priebe et al. | |

(Continued)

FOREIGN PATENT DOCUMENTS

| | | | | |
|---|---|---|---|---|
| EP | 1229347 A2 | * | 8/2002 | ......... G01S 13/4436 |
| EP | 3273262 A1 | * | 1/2018 | |

OTHER PUBLICATIONS

U. Nickel, "Overview of generalized monopulse estimation," IEEE Aerospace and Electronic Systems Magazine, vol. 21, No. 6, pp. 27-56, Jun. 2006.

(Continued)

*Primary Examiner* — Olumide Ajibade Akonai
(74) *Attorney, Agent, or Firm* — Ostrager Chong Flaherty & Broitman P.C.

(57) ABSTRACT

A collision avoidance system includes a monopulse radar antenna array of monopulse radar antenna segments mounted to a vehicle with respective fixed fields of view. Each monopulse radar antenna segment comprises a comparator network configured to form a sum signal representing a summation of return signals and a first difference signal representing a first difference of the return signals. The system further includes a user interface configured to present information in a form perceptible to a person operating the vehicle and a radar antenna array controller configured to calculate a range of the object and a first (azimuth) angle of arrival of the return signal from the object. The comparator network is further configured to form a second difference signal which the radar antenna array controller uses to calculate a second (elevation) angle of arrival.

20 Claims, 12 Drawing Sheets

(56) References Cited

U.S. PATENT DOCUMENTS

| | | | | |
|---|---|---|---|---|
| 6,087,974 A | * | 7/2000 | Yu | F41G 7/2226 |
| | | | | 342/149 |
| 6,456,238 B1 | * | 9/2002 | Posey | G01S 13/4463 |
| | | | | 342/149 |
| 6,618,008 B1 | * | 9/2003 | Scholz | G01S 7/032 |
| | | | | 342/80 |
| 7,418,343 B1 | * | 8/2008 | McGraw | G01S 3/36 |
| | | | | 244/76 R |
| 7,633,429 B1 | * | 12/2009 | Liu | G01S 13/4445 |
| | | | | 342/107 |
| 7,889,115 B2 | | 2/2011 | Clingman et al. | |
| 8,633,850 B2 | | 1/2014 | Yu | |
| 8,988,277 B2 | * | 3/2015 | Leise | H01Q 3/26 |
| | | | | 342/146 |
| 10,050,336 B2 | | 8/2018 | Wang et al. | |
| 2003/0112172 A1 | * | 6/2003 | Shinoda | G01S 13/4463 |
| | | | | 342/149 |
| 2003/0164791 A1 | * | 9/2003 | Shinoda | H01Q 3/2605 |
| | | | | 342/149 |
| 2005/0200548 A1 | | 9/2005 | Fusco et al. | |
| 2016/0291144 A1 | * | 10/2016 | Chang | G01S 7/03 |
| 2017/0343667 A1 | * | 11/2017 | Vacanti | H01Q 21/0043 |

OTHER PUBLICATIONS

V. Viikari, T. Varpula, M. Kantanen, "Automotive Radar Technology for Detecting Road Conditions Backscattering Properties of Dry, Wet, and Icy Asphalt", 5th European Radar Conference, Oct. 2008.

* cited by examiner

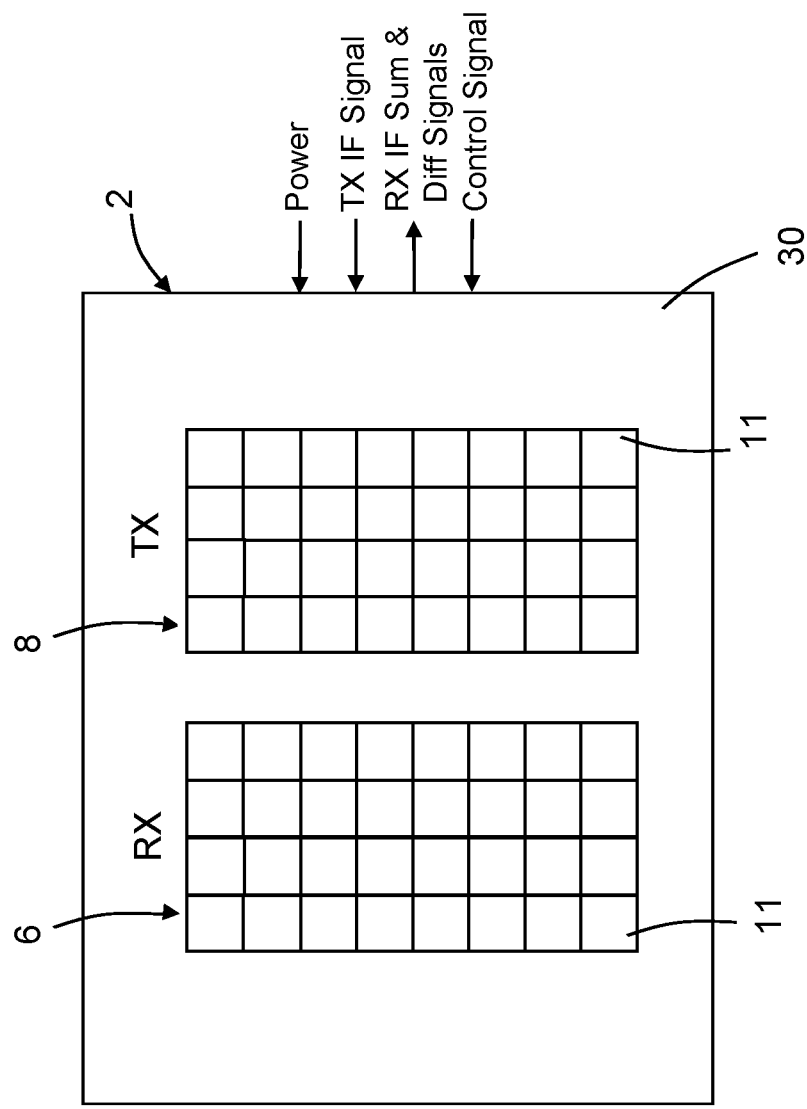
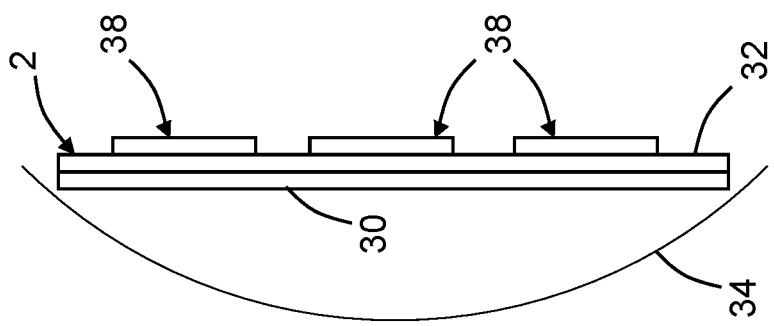
FIG. 4B
FIG. 4A

DISTRIBUTED MONOPULSE RADAR ANTENNA ARRAY FOR COLLISION AVOIDANCE

BACKGROUND

The present disclosure relates generally to collision avoidance systems. In particular, the present disclosure relates to radar systems for use in collision avoidance systems.

Radar systems are commonly used to detect and/or track still or moving objects. A radar system uses electromagnetic radiation to determine the distance and/or location of an object with respect to the radar system. Typically, a radar system transmits pulses of electromagnetic radiation that are reflected off of objects in the path of the electromagnetic radiation. A portion of this reflected electromagnetic radiation is received at the radar system and converted into electrical signals that may be processed to detect and/or track one or more objects of interest. For example, radar systems are used for collision avoidance to protect large platforms such as airplanes, whether in flight or on the ground.

Monopulse radar is an established and widely used radar methodology that extracts both range and angle of arrival from a single signal pulse using simple antennas that produce both sum and difference outputs. Monopulse radar may be used in both standard and bi-static radar configurations (either where the illuminator is the same antenna as the receiver or is a different antenna). Monopulse radar is also relatively robust against both unintentional and intentional interference (jamming) and is simple to implement. The waveform used may be pulsed Doppler or frequency-modulated continuous wave (FMCW) or almost any other type of standard radar waveform. If more than one monopulse antenna is used, the resulting array may be coherent or non-coherent. If coherent, the array is a phased array and has its corresponding advantages and disadvantages. The biggest disadvantages for phased arrays for a large platform application that must be protected from collision from all sides are the cost, complexity, non-interference and complex calibration required.

Existing automotive monopulse radar solutions are not cost effective when used to protect a large platform (such as a large airplane) from collisions at all angles because they are not intended for operation together as one larger system with non-interfering adjacent frequencies and have processing assumptions that are invalid for large airplanes (radar systems are typically far above the ground on large airplanes, leading to larger ground backscatter and self-interference)

It would be advantageous to provide a monopulse radar system capable of detecting collisions (either on the ground or in the air) in a simple and cost-effective manner that takes into account at least some of the issues discussed above.

SUMMARY

The technology disclosed in some detail below solves the problem of detecting collisions (either on the ground or in the air) using radar on large platforms in a simple and cost-effective manner The proposed technology is based on the concept of a distributed non-coherent monopulse radar array configured as a single radar system with wide field of view coverage, simple inexpensive radar antenna segments and central radar system control. This concept is ideal for protection of large platforms such as airplanes when using radar for collision avoidance, whether in flight or on the ground.

Monopulse systems use simple antenna configurations to provide range and angle of arrival (AOA) of all reflections impinging on the antenna system. This simplicity reduces cost and interference/jamming concerns from other more complicated systems such as phased arrays. Phased arrays require phase shifters to point beams with complicated control circuitry that adds to its overall cost, while monopulse radar is a staring approach that does not require beam pointing. When a wide field of view is required, such as in collision avoidance for airplanes, the cost for phased arrays may be prohibitive.

The technology proposed herein includes a distributed monopulse system that is non-coherent and so does not require fine calibration as a large phased array would. Instead, the proposed distributed monopulse system includes a set of staring monopulse radars (each one is referred to hereinafter as a "radar antenna segment") that each have a respective field of view and pointing direction, so that the total system covers the overall desired field of view for object detection.

In accordance with some embodiments, the distributed monopulse radar system proposed herein includes a non-coherent array of identical monopulse radar antenna segments (hereinafter "radar antenna segments"), each having an integrated transmitter and receiver which covers a fixed field of view with localized circuitry and simple controls. Since the antenna array is non-coherent (unlike phased arrays), slight relative changes between antennas do not affect the array's function. This is especially important for installation and structural changes when distributing these antennas across a large platform relative to the wavelength. The problem of interference between array elements may be solved by using different frequencies on antennas with adjacent fields of view.

Although various embodiments of systems and methods for detecting objects using non-coherent monopulse radar for collision avoidance are described in some detail later herein, one or more of those embodiments may be characterized by one or more of the following aspects.

One aspect of the subject matter disclosed in detail below is a collision avoidance system for a vehicle comprising: a monopulse radar antenna array mounted to the vehicle and comprising a plurality of monopulse radar antenna segments having respective fixed fields of view, wherein each monopulse radar antenna segment comprises a comparator network configured to form a sum signal representing a summation of return signals received by the monopulse radar antenna segment and to form a first difference signal representing a first difference of the return signals received by the monopulse radar antenna segment; a user interface configured to present information in a form perceptible to a person operating the vehicle; and a radar antenna array controller electrically connected to the plurality of monopulse radar antenna segments and to the user interface. The radar antenna array controller is configured to perform operations comprising: calculating a range of the object based on a time difference between transmission and reception; calculating a first angle of arrival of the return signal from the object based on a ratio of the first difference signal and the sum signal; and sending information regarding the range and the angular position of the object to the user interface.

In accordance with some embodiments of the collision avoidance system described in the immediately preceding paragraph, the comparator network is further configured to form a second difference signal representing a second difference of the return signals received by the monopulse radar antenna segment; and the radar antenna array controller is further configured to perform operations comprising calculating a second angle of arrival of the return signal from the object based on a ratio of the second difference signal and the sum signal. The first angle of arrival is an azimuth angle and the second angle of arrival is an elevation angle of the object relative to the vehicle. In accordance with one embodiment, the user interface is a display device configured to display the information regarding the range and angular position of the object in a form of a track of a potentially colliding object.

Another aspect of the subject matter disclosed in detail below is a method for detecting an object comprising: (a) synchronously transmitting respective pulses from a plurality of monopulse radar antenna segments mounted to a vehicle with respective fields of view; (b) receiving return signals from an object at one monopulse radar antenna segment of the plurality of monopulse radar antenna segments following synchronous transmission; (c) converting the return signals into a sum signal and a first difference signal; (d) processing the sum signal and first difference signal to estimate a first angle of arrival of the return signals; (e) determining a range of the object based on a time difference between transmission and reception; and (f) displaying symbology indicating the range and angular position of the object relative to the vehicle.

In accordance with some embodiments of the method described in the immediately preceding paragraph, the method further comprises: (f) converting the return signals into a second difference signal; and (g) processing the sum signal and second difference signal to estimate a second angle of arrival of the return signals. The first angle of arrival is an azimuth angle and the second angle of arrival is an elevation angle of the object relative to the vehicle. In one proposed implementation, the symbology is a track indicating successive ranges and angular positions of the object.

A further aspect of the subject matter disclosed in detail below is an aircraft comprising: a plurality of monopulse radar antenna segments having respective fixed fields of view and arranged to form a monopulse radar antenna array having a total field of view, wherein each monopulse radar antenna segment comprises a comparator network configured to form a sum signal representing a summation of return signals received by the monopulse radar antenna segment and form a first difference signal representing a first difference of the return signals received by the monopulse radar antenna segment; a user interface configured to present information in a form perceptible to a pilot operating the aircraft; and a radar antenna array controller electrically connected to the plurality of monopulse radar antenna segments and to the user interface. The radar antenna array controller is configured to perform operations comprising: calculating a range of the object based on a time difference between transmission and reception; calculating a first angle of arrival of the return signal from the object based on a ratio of the first difference signal and the sum signal; and sending information regarding the range and the angular position of the object to the user interface.

In accordance with some embodiments of the aircraft described in the immediately preceding paragraph, the comparator network is further configured to form a second difference signal representing a second difference of the return signals received by the monopulse radar antenna segment; and the radar antenna array controller is further configured to perform operations comprising calculating a second angle of arrival of the return signal from the object based on a ratio of the second difference signal and the sum signal. The first angle of arrival is an azimuth angle and the second angle of arrival is an elevation angle of the object relative to the aircraft. In one proposed implementation, the monopulse radar antenna array is mounted to a wing tip of a wing. In another proposed implementation, the monopulse radar antenna array is mounted to a window hole in the fuselage.

Other aspects of systems and methods for detecting objects using non-coherent monopulse radar for collision avoidance are disclosed below.

BRIEF DESCRIPTION OF THE DRAWINGS

The features, functions and advantages discussed in the preceding section may be achieved independently in various embodiments or may be combined in yet other embodiments. Various embodiments will be hereinafter described with reference to drawings for the purpose of illustrating the above-described and other aspects. None of the diagrams briefly described in this section are drawn to scale.

FIGS. 4A and 4B are diagrams representing side and top views respectively of a conceptualized monopulse radar antenna segment in accordance with one proposed implementation.

Reference will hereinafter be made to the drawings in which similar elements in different drawings bear the same reference numerals.

DETAILED DESCRIPTION

Figure 1:
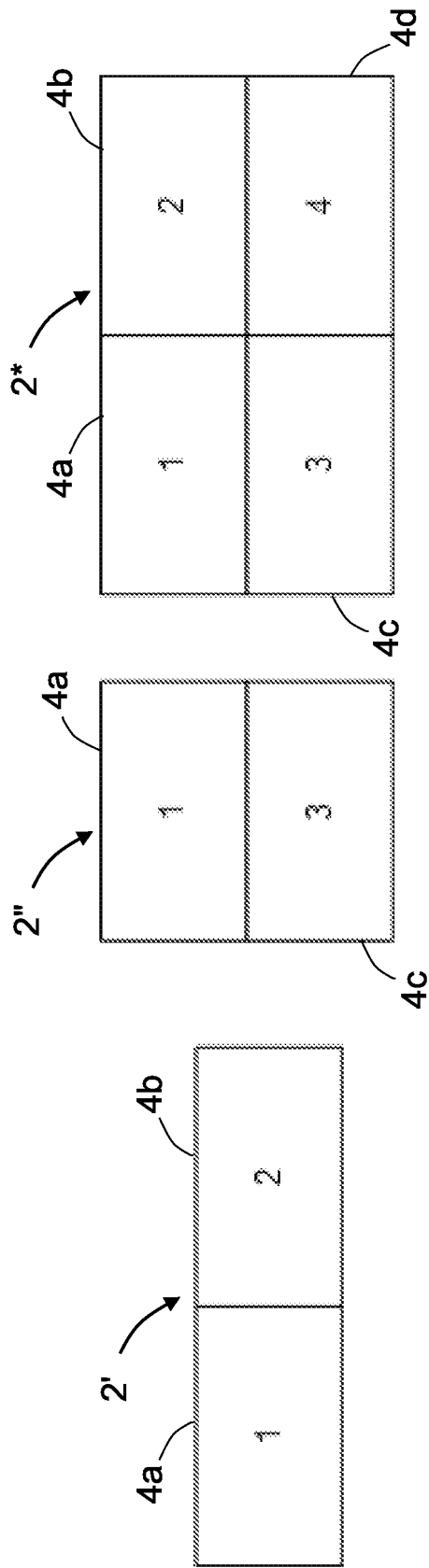
FIGS. 1A-1C are diagrams respectively representing a two-quadrant azimuth monopulse antenna (FIG. 1A), a two-quadrant elevation monopulse antenna (FIG. 1B), and a four-quadrant azimuth and elevation monopulse antenna (FIG. 1C).

Illustrative embodiments of systems and methods for detecting objects using non-coherent monopulse radar for collision avoidance are described in some detail below. However, not all features of an actual implementation are described in this specification. A person skilled in the art will appreciate that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

In telecommunications and radar engineering, antenna boresight is the axis of maximum gain (maximum radiated power) of a directional antenna. For most antennas, the boresight is the axis of symmetry of the antenna. The radiation pattern of most antennas shows a pattern of lobes at various angles (directions) where the radiated signal strength reaches a maximum, separated by nulls (angles at which the radiation falls to zero). In a radio antenna's radiation pattern, the main lobe, or main beam, is the lobe that exhibits the greater field strength. The other lobes are called sidelobes, and usually represent unwanted radiation in undesired directions. Typically the radiation pattern is horizontal and plotted as a function of azimuth about the antenna, although the vertical radiation pattern may also have a main lobe. The beamwidth of the antenna is the width of the main lobe, usually specified by the half power beam width, the angle encompassed between the points on the side of the lobe where the power has fallen to half (−3 dB) of its maximum value. Beamwidth is usually but not always expressed in degrees and for the horizontal plane.

A monopulse antenna is one method of realizing a tracking radar. The word "monopulse" implies that with a single pulse, the antenna can gather angle information, as opposed to spewing out multiple narrow-beam pulses in different directions and looking for the maximum return. Monopulse systems use simple antenna configurations to provide range and angle of arrival (AOA) of all reflections impinging on the antenna system. This simplicity reduces cost and interference/jamming concerns from other more complicated systems such as phased arrays. Phased arrays require phase shifters to point beams with complicated control circuitry that adds to its overall cost, while monopulse radar is a staring approach that does not require beam pointing. When a wide field of view is required, such as in collision avoidance for airplanes, the cost for phased arrays may be prohibitive.

This disclosure proposes a distributed monopulse system that is non-coherent and so does not require fine calibration as a large phased array would. Instead, the radar system disclosed herein includes a set of staring monopulse radars (each one is called a "monopulse radar antenna segment") that each have a respective field of view and pointing direction so that the total system covers the overall desired field of view for collision detection. In accordance with one embodiment, the respective fields of view of the set of staring monopulse radars are non-overlapping. In alternative embodiments, the radar set may have slightly overlapping fields of view. This concept is ideal for protection on large platforms when using radar for collision detection, whether in flight or on the ground.

The monopulse radar system uses four antennas (or quadrants of a single antenna). They may be horns, or sections of a flat plate array of radiators. The target is illuminated by all four quadrants equally. Typically, a monopulse radar system generates signals that are used to identify an angular location of a target object with respect to the monopulse radar system. The angular location of a target object with respect to a monopulse radar system includes an azimuth angle and an elevation angle of the target object with respect to the monopulse radar system. In other words, the angular location of a target object with respect to a monopulse radar system may be a direction of the target object with respect to the monopulse radar system.

A typical monopulse radar system provides both range and angle of arrival using simple antennas that produce both sum and difference outputs. The monopulse method enables accurate angle of arrival (AOA) estimation using the classical two- or four-quadrant array configurations, as illustrated in FIGS. 1A-1C. Two-quadrant antennas with sum and different outputs produce one-dimensional angle of arrival (AOA) information (elevation or azimuth, for example) and four-quadrant antennas with two difference outputs and one total sum output can produce two-dimensional AOA information. FIG. 1A shows an azimuth monopulse radar antenna segment 2' having a quadrant 4a and a quadrant 4b arranged side by side; FIG. 1B shows an elevation monopulse radar antenna segment 2" having a quadrant 4a and a quadrant 4c arranged one above the other; and FIG. 1C shows an azimuth and elevation monopulse radar antenna segment 2\* having four quadrants: a quadrant 4a in the upper left-hand corner, a quadrant 4b in the upper right-hand corner; a quadrant 4c in the lower left-hand corner, and a quadrant 4d in the lower right-hand corner.

In the transmission mode, the four quadrants of azimuth and elevation monopulse radar antenna segment 2\* produce a sum pattern. In the reception mode, the received signals are used to "calculate" sum and difference signals which are compared and used to estimate the angle of arrival (angle of the target object). After the target object has been illuminated by all four quadrants equally, a comparator network is used to generate four return signals. The sum signal has the same pattern in receive as transmit and is used to track the range and velocity of the target object. The elevation difference signal is formed by subtracting the return signals sensed by the two upper quadrants from those sensed by the two lower quadrants, and is used to calculate the target object's position relative to the horizon (elevation angle). The azimuth difference signal is formed by subtracting the return signals sensed by the left quadrants from those sensed by the right quadrants and is used to calculate the target object's position to the left or right (azimuth angle).

Figure 2:
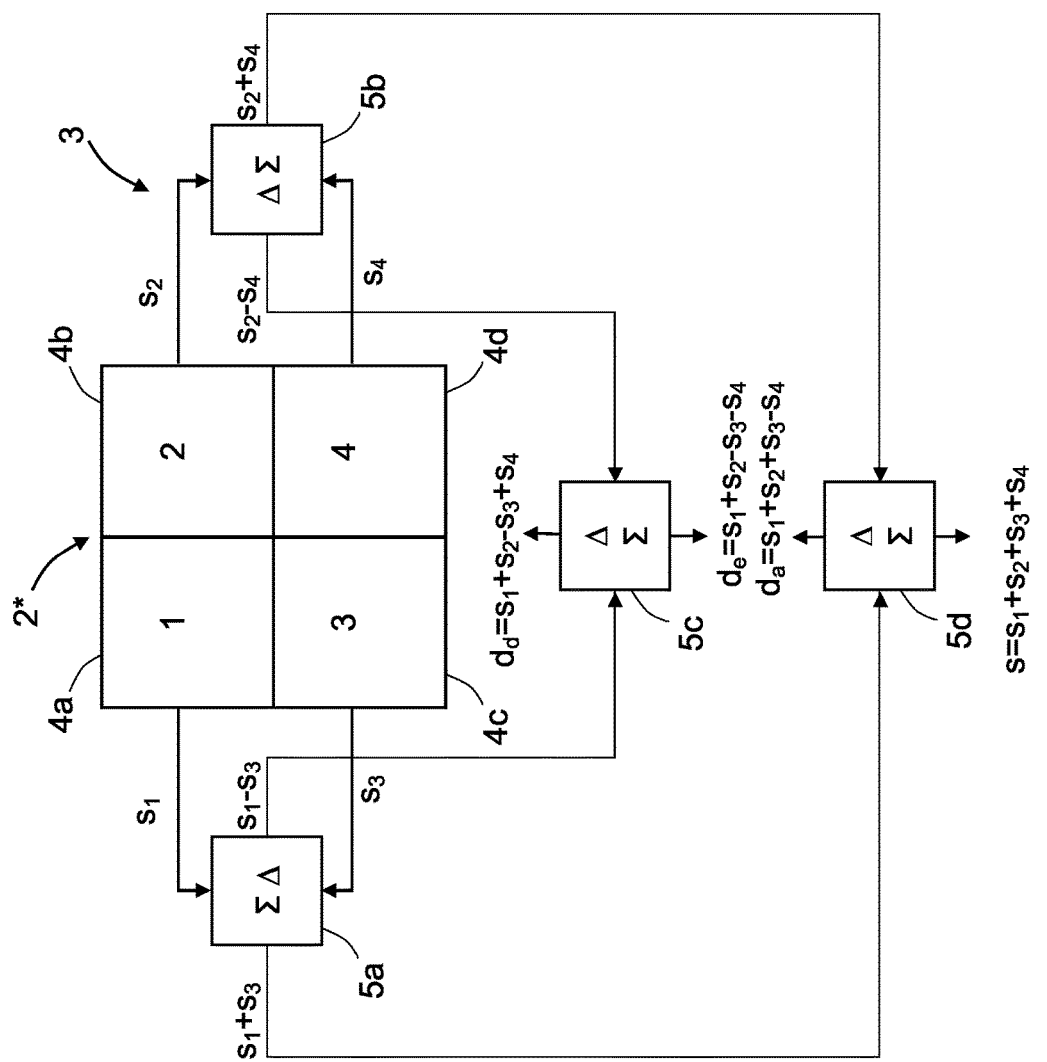
FIG. 2 is a block diagram of a monopulse antenna, including a comparator network configured to produce sum and difference signals during reception.

FIG. 2 is a block diagram showing four quadrants 4a-4b and a comparator network 3 configured to produce sum and difference signals during reception. The comparator network 3 includes four hybrid ring junctions 5a-5d arranged to perform arithmetic operations as the analog signals are added and subtracted to form the four receiver channels. The hybrid ring junction 5a receives return signal $s_1$ from the first quadrant 4a and return signal $s_3$ from the third quadrant 4c, and then outputs the sum signal $s_1+s_3$ to hybrid ring junction 5d and outputs the difference signal $s_1-s_3$ to hybrid ring junction 5c. Similarly, hybrid ring junction 5b receives return signal $s_2$ from the second quadrant 4b and return signal $s_4$ from the fourth quadrant 4d, and then outputs the sum signal $s_2+s_4$ to hybrid ring junction 5d and outputs the difference signal $s_2-s_4$ to hybrid ring junction 5c. The hybrid junction 5d outputs the sum signal $s=s_1+s_2+s_3+s_4$ and the azimuth difference signal $d_a=s_1+s_2+s_3-s_4$. The hybrid junction 5c outputs the elevation difference signal $d_e=s_1+s_2-s_3-s_4$ and the discarded difference signal $d_d=s_1+s_2-s_3+s_4$.

The technology disclosed herein uses a non-coherent array of monopulse antennas called a distributed monopulse radar antenna array in which each identical integrated transmitter and receiver (called a "monopulse radar antenna segment") covers a respective fixed field of view with localized circuitry and simple controls. More specifically, a plurality of monopulse radar antenna segments with respective fields of view are mounted and arranged on a vehicle, such as aircraft 10 shown in FIG. 3, to form a monopulse radar antenna array having a total field of view that encompasses the respective fields of view. Since it is non-coherent (unlike phased arrays), slight relative changes between antennas do not affect the array's function. This is especially important for installation and structural changes when distributing these antennas across a large platform relative to the wavelength. The problem of interference between array elements may be solved by using different frequencies on antennas with adjacent fields of view.

Figure 3:
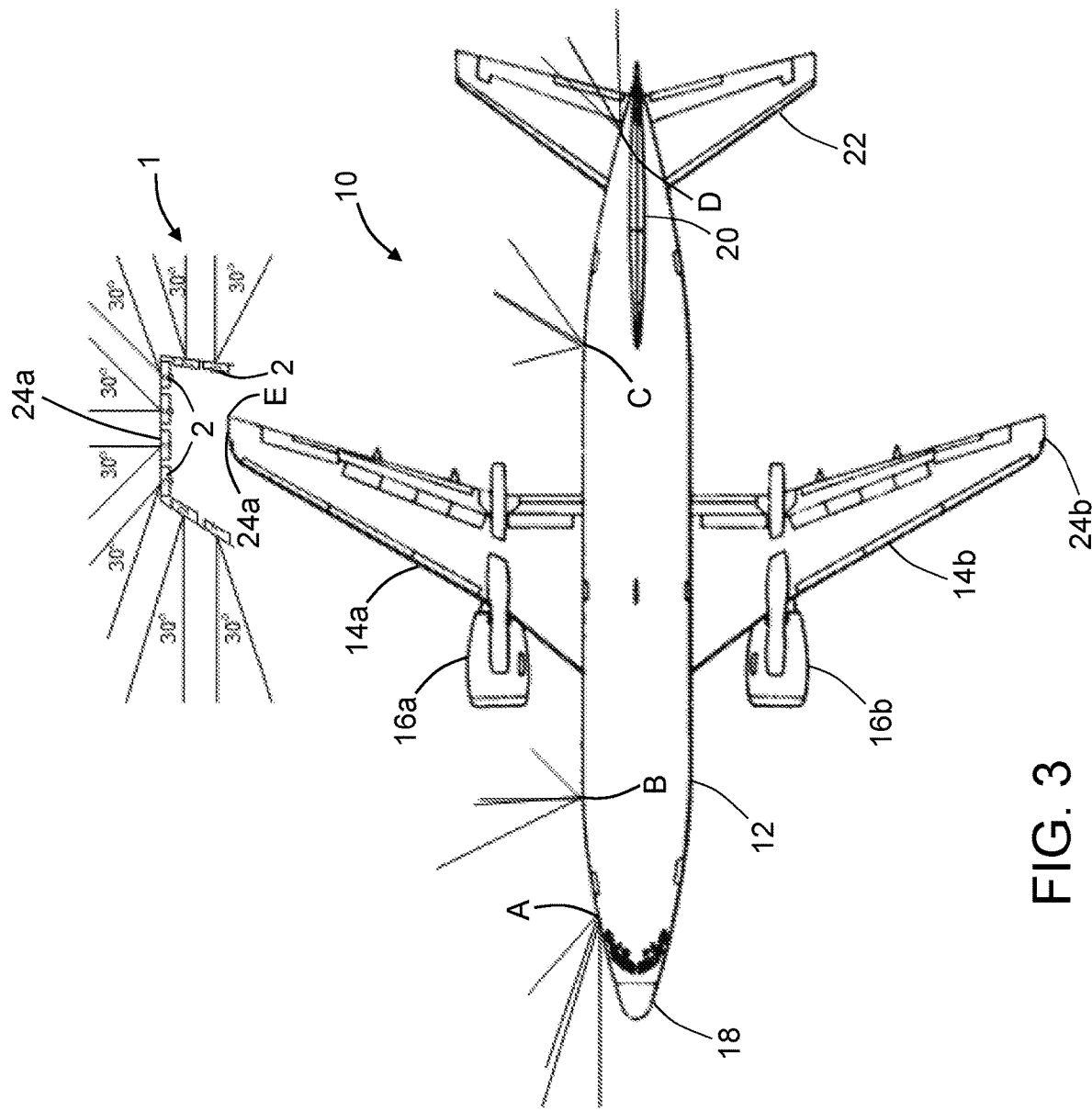
FIG. 3 is a diagram representing a top view of an aircraft showing installation locations for monopulse radar antenna arrays, including a top view on a magnified scale of a wing tip-mounted monopulse radar antenna array having a total field of view of 240 degrees.

There are a number of installation concepts for collision avoidance radar on large aircraft. Two concepts are shown in FIG. 3, which represents a top view of an aircraft 10 showing installation locations for monopulse radar antenna arrays. The aircraft includes a fuselage 12 having a nose 18, two wings 14a and 14b, two engines 16a and 16b respectively mounted to wings 14a and 14b, a vertical stabilizer 20, and a horizontal stabilizer 22. Installation locations A, B, and C are window holes; installation location D is a body hole in the empennage; and installation location E is a wing tip 24a.

FIG. 3 includes a top view on a magnified scale of a monopulse radar antenna array 1 mounted to wing tip 24a and having a total field of view of 240 degrees. In this proposed implementation, the monopulse radar antenna array 1 includes eight monopulse radar antenna segments 2, each having a field of view equal to about 30 degrees. In alternative implementations, this sensor would be replicated to cover 90 or 180 degrees as needed in application. The respective fields of view of adjacent monopulse radar antenna segments 2 may be non-overlapping or partially overlapping. The wing tip concept gives the widest, most unobstructed field of view and provides direct protection of the wing tips (which are most often involved in ground collisions). FIG. 3 shows a system with eight monopulse radar antenna segments 2 covering 240 degrees.

Also shown is a concept which installs each monopulse radar antenna segment in a small portion of a window hole (thus eliminating costly redesign of a wing tip or winglet and making radome installation much simpler). In this concept, only a couple of the monopulse radar antenna segments in the rear of the aircraft would require new body holes (if coverage in the rear is required). Coverage of the other side of the aircraft would be done symmetrically (not shown).

Applications of this distributed monopulse radar system include both a ground/taxi-based and in-air-based aircraft collision avoidance sensor system by enlarging the detection and tracking range and enabling collision alerts to be both more reliable and more timely. By having a more timely alert of potential collision for aircraft that are about to take off, this could prevent collisions without the need for avoidance maneuvers. Alternatively, aircraft in the air would have a longer warning time period, which would allow for a safer slower avoidance maneuver as well as giving more time to alert other aircraft about the detected objects.

The monopulse radar operations proposed herein use antennas which provide a sum output and a difference output in order to measure both range and angle of arrival. Upon reception of a reflected radar pulse at a monopulse antenna, the sum and difference output signals must be converted to a range and an angle of arrival. While the range is simply related to the time difference between transmission and reception, the angle of arrival must be inferred through a mathematical process. That mathematical process is described below.

The mathematical process is configured to estimate the parameter $\hat{r}$ using the following equation:

$$\hat{r} = u(\theta,\phi)\hat{x} + v(\theta,\phi)\hat{y} + \cos(\theta)\hat{z},$$

which is the direction from the radar antenna phase center (boresight) to the radiation source with respect to the system of coordinates $\hat{x}$, $\hat{y}$, $\hat{z}$. Here $\theta$ is the azimuth angle and $\phi$ is the elevation angle. Let $s_1$, $s_2$, $s_3$ and $s_4$ be the signals received simultaneously by the sub-arrays (quadrants 4a-4d) depicted in FIG. 2 with the corresponding index. The sum s, elevation difference $d_e$ and azimuth difference $d_a$ are defined as $$s = s_1 + s_2 + s_3 + s_4$$

$$d_e s_1 + s_2 - s_3 - s_4$$

$$d_a s_1 - s_2 + s_3 - s_4$$

The measured elevation difference signal due to an incident plane wave, with amplitude A and unit polarization $\hat{n}$ is determined by $$d_e(\hat{r}) = A\hat{n}[C_1\vec{f}_1(v)(\hat{r})e^{jkr_1(\hat{r}-\hat{r}_0)} + C_2\vec{f}_2(v) \\ (\hat{r})e^{jkr_2(\hat{r}-\hat{r}_0)} - C_3\vec{f}_3(v)(\hat{r})e^{jkr_3(\hat{r}-\hat{r}_0)} - C_4 \\ \vec{f}_4(v)(\hat{r})e^{jkr_4(\hat{r}-\hat{r}_0)}] \quad (1)$$

where $\vec{f}_i(v)$ is the vector far-field amplitude of sub-arrays i=1, ..., 4 and $k=2\pi/\lambda$ (where $\lambda$ is wavelength).

A progressive phase or time delay distribution over the array aperture is assumed to steer the main lobe in the sum pattern in the direction $$\hat{r}_0 = u_0\hat{x} + v_0\hat{y} + \cos(\theta_0)\hat{z}.$$

Equation (1) is valid when the far-field amplitudes are normalized. The frequency-dependent coefficients $C_i$ for i =1, ..., 4 describe the receiving properties such as loss, low noise amplification and mismatch. The monopulse receiver should be carefully designed such that these coefficients are nearly equal and hence $C \approx C_i$. Furthermore, the assumption is made in what follows that the sub-arrays (see FIG. 2) are of equal size and tapering. One may therefore introduce the following notation:

$$C A \hat{n} \cdot \vec{f}_i(v)(\hat{r}) = f(\hat{r}) + \in(\hat{r})$$

where the error term $\in(\hat{r})$ has been introduced. This error term includes effects such as the following:

The sub-array far-field amplitudes $\vec{f}_i(v)$ are not exactly equal, since they are subject to different edge effects. Furthermore, it is usually of interest to taper the sub-arrays differently in order to suppress the side lobe level.

The far-field amplitudes $\vec{f}_i(v)$ may also include installation effects, e.g., reflection and refraction in the radome, and reflections in the platform.

There may be some non-ideal performance of the array feed network, thereby producing some error in the approximation $C \approx C_i$.

The method described below may be used to study the edge and installation effects. The classical derivation for AOA estimation below assumes the idealized case $\in(\hat{r})=0$. Assume that the phase center of each sub-array is located in the geometrical center of the corresponding sub-array, i.e., $$\vec{r}_1 = -w\hat{x}/4 + h\hat{y}/4$$

$$\vec{r}_2 = w\hat{x}/4 + h\hat{y}/4$$

$$\vec{r}_3 = -w\hat{x}/4 - h\hat{y}/4$$

$$\vec{r}_4 = w\hat{x}/4 - h\hat{y}/4$$

Using Euler's formula, it is possible to simplify Eq. (1), giving the elevation difference signal:

$$d_e(\hat{r}) = 4jf(\hat{r}) \cos(kw(u-u_0)/4) \sin(kh(v-v_0)/4) \quad (2)$$

The azimuth difference and sum signals are found in a similar manner:

$$d_a(\hat{r}) = -4jf(\hat{r}) \sin(kw(u-u_0)/4) \cos(kh(v-v_0)/4) \quad (3)$$

$$s(\hat{r}) = 4f(\hat{r}) \sin(kw(u-u_0)/4) \cos(kh(v-v_0)/4) \quad (4)$$

By respectively dividing Eqs. (2) and (3) by Eq. (4), the following relations between the monopulse ratios and the AOA (u, v) are obtained:

$$\frac{d_e}{s} = j\tan(k_e(v-v_0)) \quad (5)$$

$$\frac{d_a}{s} = -j\tan(k_a(u-u_0)) \quad (6)$$

The advantage of this normalization is that the monopulse ratios are independent of f ($\hat{r}$). However, this premise only holds for the idealized case $\in = 0$. The monopulse slope coefficients are given by $\kappa_e = kh/4$ and $\kappa_a = kw/4$ for the case of equal sub-arrays. When tapering is applied in a way where the sub-arrays are not equal, Eqs. (5) and (6) may still be applied approximately by replacing the monopulse slope coefficients $\kappa_e$ and $\kappa_a$ by their corresponding tapered values. By tapering the array excitation, the beamwidth is increased and the monopulse slope coefficients are therefore decreased.

In conclusion, the unknowns u and v may be directly determined from the measured monopulse ratios by inverting Eqs. (5) and (6). Thereafter, $\theta$, $\phi$ and $\hat{r}$ may be calculated. In principle, this enables the AOA to be estimated from a single measurement, hence the name "monopulse". It is common to linearize Eqs. (5) and (6) under the assumption that $|v-v_0|$ and $|u-u_0|$ are small. Since Eqs. (5) and (6) are periodic, the estimates of u and v are ambiguous outside the unambiguous region:

$$\frac{\pi}{2} > \begin{cases} k_e|v-v_0| \\ k_a|u-u_0| \end{cases}$$

In practice, a guard antenna is therefore needed to verify that the measured signal was received within the unambiguous region and not in the side lobes.

The distributed monopulse array design proposed herein has two main parts: a monopulse radar antenna array controller and one or more radar antenna array segments to cover the designed field of view. Each radar antenna array segment consists of a simple combined transmit and receive antenna (or separate transmit and receive antennas if it is desired to avoid usage of a radio frequency (RF) circulator to decrease cost and complexity), together with up conversion circuitry for the transmitter and down conversion circuitry for the receiver and simple frequency and amplitude control. Each radar antenna array segment may be designed to be very small (e.g., a rectangle having a length equal to 3.5 inches and a width equal to 2 inches). Thus, a radar antenna array segment may be installed in many different locations, including inside a wing tip or as a small part of a window.

FIGS. 4A and 4B are diagrams representing side and top views respectively of a conceptualized monopulse radar antenna segment 2 in accordance with one example. As seen in FIG. 4B, the example monopulse radar antenna segment 2 includes a receive antenna 6 in the form of one 4×8 array of antenna elements 11 (interconnected by a comparator network not shown) and a transmit antenna 8 in the form of another 4×8 array of antenna elements 11 (interconnected by a splitter network not shown) printed on an antenna array substrate 30. In alternative implementations, the numbers of rows and columns of antenna elements 11 may differ from this example having four columns and eight rows. As seen in FIG. 4A, the monopulse radar antenna segment 2 further includes an integrated circuit substrate 32 which is joined with the antenna array substrate 30 to form a printed circuit board that may be easily installed as a module. Various integrated circuits 38 (described in some detail below with reference to FIG. 6) are surface mounted to the integrated circuit substrate 32. The installed module is covered by a radome 34 constructed of material that minimally attenuates the electromagnetic signals transmitted or received by the antenna.

As indicated by arrows in FIG. 4B, the monopulse radar antenna segment 2 receives electrical power, transmit intermediate frequency (IF) signals, and control signals for controlling the transmit and receive radio frequencies. In addition, the monopulse radar antenna segment 2 outputs receive IF signals for processing by the controller (not shown in FIG. 4B, but see monopulse radar antenna array controller 50 in FIG. 7).

Figures 5A, 5B:
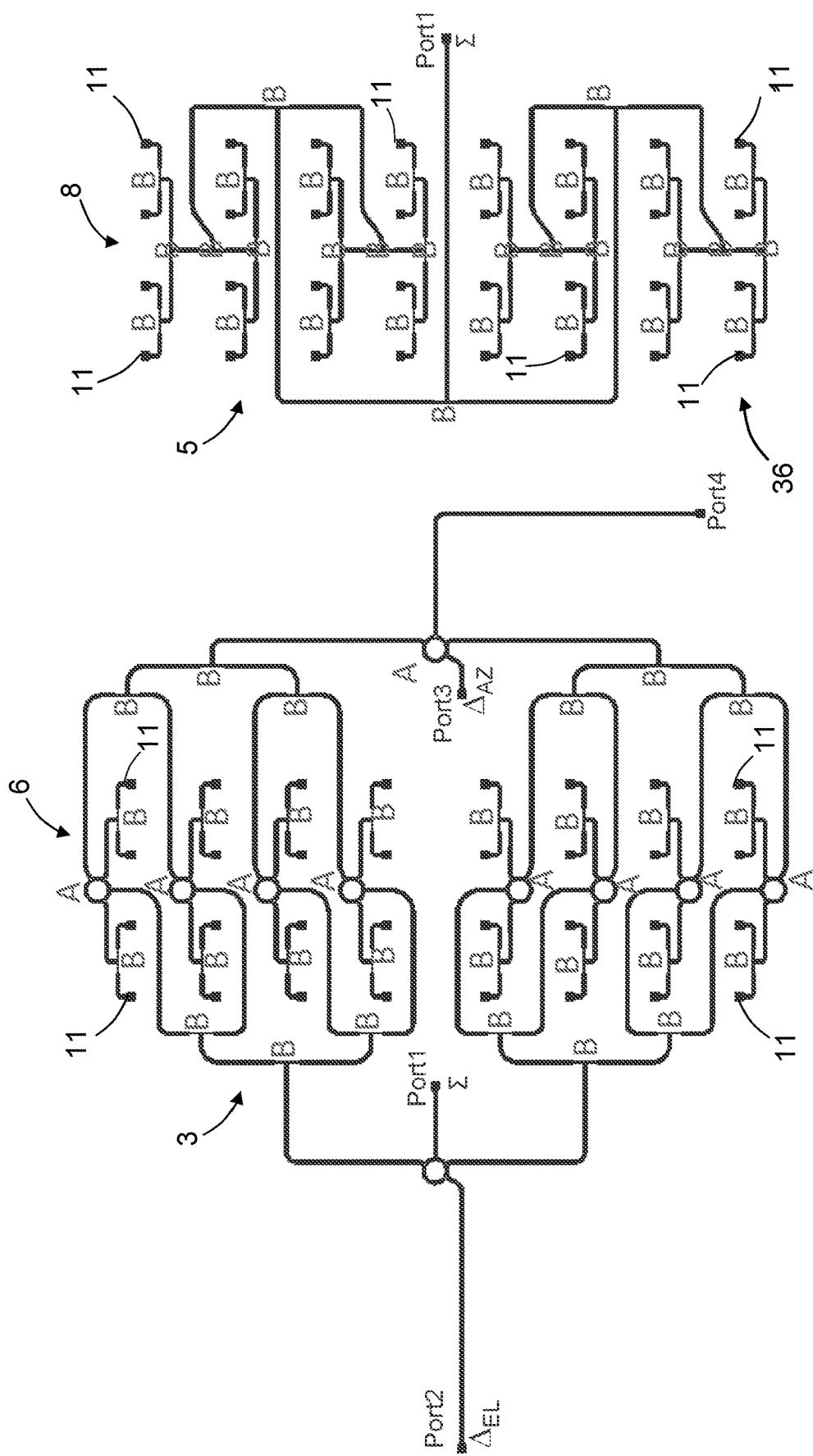
FIG. 5A is a circuit diagram representing a comparator network of a receive antenna configured to produce sum and difference outputs in accordance with one proposed implementation.
FIG. 5B is a circuit diagram representing a splitting network of a transmit antenna in accordance with one proposed implementation.

FIG. 5A is a circuit diagram representing a comparator network 3 of a receive antenna 6 having a 4×8 array of antenna elements 11. FIG. 5B is a circuit diagram representing a splitting network 5 of a transmit antenna 8 having a 4×8 array of antenna elements 11.

Referring to FIG. 5B, the transmit antenna 8 receives the electrical transmit pulse at Port1. The splitting network 5 includes a multiplicity of junctions B which split that single electrical transmit pulse into thirty-two individual electrical transmit pulses that are respectively converted into thirty-two individual emitted radio waves by the antenna elements 11 of the transmit antenna 8.

Referring to FIG. 5A, the comparator network 3 of the receive antenna 6 is configured to convert electrical return signals output by antenna elements 11 into a sum signal (Σ) at Port1, an elevation difference signal ($\Delta_{EL}$) at Port2, an azimuth difference signal ($\Delta_{AZ}$) at Port3, and a fourth signal that is not used at Port4. The comparator network 3 includes a multiplicity of hybrid ring junctions A and a multiplicity of junctions B. Each hybrid ring junction A has four ports. If inputs are applied simultaneously to the first and second ports, their sum will appear at the third port and their difference will appear at the fourth port. The return signals received at the first and second antenna elements in each row are combined by one junction B that is connected to the first port of the hybrid ring junction A for that row; the return signals received at the third and fourth antenna elements in each row are combined by another junction B that is connected to the second port of the hybrid ring junction A for that row. Other junctions B combine the outputs of the hybrid ring junctions A for all rows and provide the combined signal to the hybrid ring junction A that is connected to Port1 and Port2. Additional junctions B combine the outputs of the hybrid ring junctions A for all rows and provide the combined signal to the hybrid ring junction A that is connected to Port3 and Port4.

Figure 6:
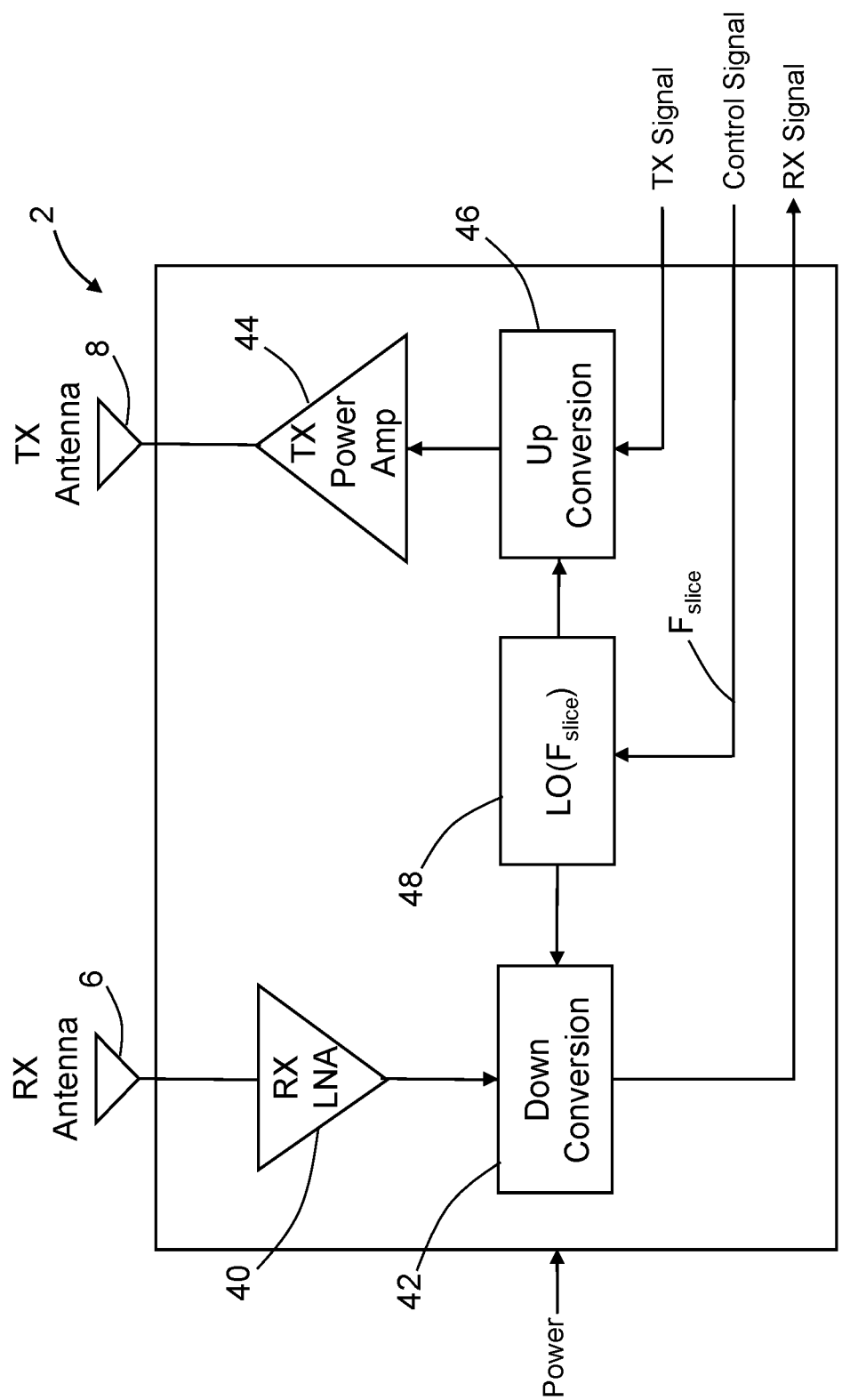
FIG. 6 is a block diagram identifying integrated circuits mounted to a printed circuit board of a monopulse radar antenna segment in accordance with one embodiment.

FIG. 6 is a block diagram identifying integrated circuits (chips) mounted to a printed circuit board of a monopulse radar antenna segment 2 in accordance with one embodiment. The radar antenna array segment 2 shown in FIG. 5 includes a transmitter antenna 8 and receiver antenna 6 (one for each operating mode; e.g., ground and in-air are two possible modes), along with a transmit power amplifier 44 having an output connected to the transmit antenna 8 and a receive low-noise amplifier 40 having an input connected to the receive antenna 6. The transmit power amplifier 44 amplifies the transmitted signal; the receive low-noise amplifier 40 amplifies the received signal. The radar antenna array segment 2 shown in FIG. 5 further includes up conversion circuitry 46 having an input which receives the transmit IF signal ("TX Signal" in FIG. 6) and an output connected to an input of the transmit power amplifier 44. The up conversion circuitry 46 converts the transmit IF signal to its correct radio frequency. The radar antenna array segment 2 further includes down conversion circuitry 42 having an input which receives the received RF signal from the output of the receive low-noise amplifier 40. The down conversion circuitry 42 converts the received RF signal down to an intermediate frequency ("RX Signal" in FIG. 6) for processing by the controller 50 (see FIG. 7). The radar antenna array segment 2 further includes a local oscillator 48 having respective outputs connected to inputs of the down conversion circuitry 42 and the up conversion circuitry 46. The local oscillator 48 outputs an electrical signal having a frequency $F_{slice}$, which frequency is contained in a control signal received from the controller 50. As explained in more detail below, the frequency $F_{slice}$ for one radar antenna array segment 2 may be different than the frequency $F_{slice}$ for an adjacent radar antenna array segment. The local oscillator 48 is an electronic oscillator used with a mixer in the conversion circuitry to change the frequency of a signal. In FIG. 6, the control signal input to each radar antenna array segment 2 is shown as controlling the RF transmit and receive frequencies. There may be other possible control signals, such as amplitude or filter control.

Figure 7:
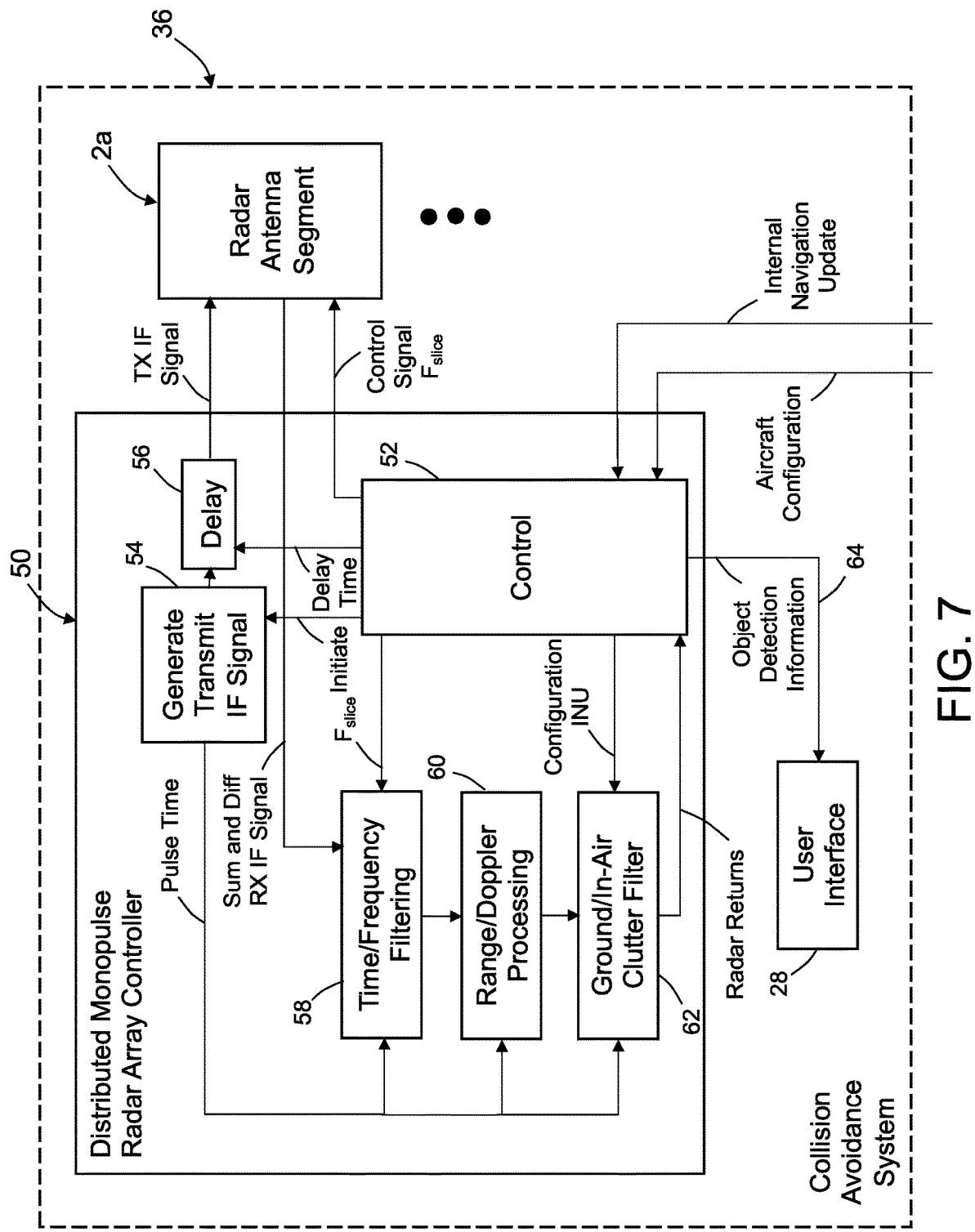
FIG. 7 is a processing diagram showing modules and operations of a distributed monopulse radar antenna array controller in accordance with one embodiment of a collision avoidance system. The three filled dots indicate that the controller is also electrically connected to other monopulse radar antenna segments of the monopulse radar antenna array.

FIG. 7 is a processing diagram showing modules and operations of a distributed monopulse radar antenna array controller 50 (hereinafter "radar antenna array controller 50") in accordance with one embodiment of a collision avoidance system 36. FIG. 7 shows a first radar antenna array segment 2a electrically connected to the radar antenna array controller 50. The three filled dots in FIG. 7 indicate that the radar antenna array controller 50 is also electrically connected to other monopulse radar antenna segments (not shown) of the monopulse radar antenna array.

The processing modules shown in FIG. 7 include a control module 52, a transmit IF signal generation module 54, a delay module 56, a time/frequency filter 58, a range/Doppler processing module 60, and a ground/in-air clutter filter 62. The transmit IF signal generation module 54, delay module 56, time/frequency filter 58, and ground/in-air clutter filter 62 are electrically connected to the control module 52. The transmit IF signal generation module 54 is further electrically connected to delay module 56, time/frequency filter 58, range/Doppler processing module 60, and ground/in-air clutter filter 62. The delay module 56 and time/frequency filter 58 are further electrically connected to the radar antenna array segment 2. The range/Doppler processing module 60 is further electrically connected to the time/frequency filter 58 and the ground/in-air clutter filter 62.

The control module 52 provides the control for the entire distributed monopulse radar array. The control module 52 initiates generation of the IF radar pulses by the transmit IF signal generation module 54, sends delay times to the delay module 56 for delaying the IF radar pulses appropriately, generates a guard frequency scheme (see below for a description) for each radar antenna array segment 2 by sending a selected frequency $F_{slice}$ to the time/frequency filter 58, and produces the final object detection information 64, which includes a respective range and respective angular position for each potentially colliding object computed from the output ("Radar Returns" in FIG. 7) of the ground/in-air clutter filter 62. The transmit IF signal generation module 54 is controlled by the control module 52 and generates the transmitted signal in IF form to each radar antenna array segment 2 at the proper time in order to synchronize the transmission of each radar pulse across the monopulse array (hereinafter referred to as "synchronous transmission"). The pulse time is sent to each of the time/frequency filter 58, range/Doppler processing module 60, and ground/in-air clutter filter 62 to synchronize their operation with respect to the radar pulse.

The delay module 56 delays the transmitted signal by a desired amount in order to synchronize the transmitted signal at each radar antenna array segment 2 with every other radar antenna array segment. The delay module 56 is described in more detail below where array delay compensation is explained.

The time/frequency filter 58 passes along a filtered version of the received signal from each radar antenna array segment 2 that is intended for range/Doppler processing.

The range/Doppler processing module 60 is the standard monopulse radar processing portion that takes the gated sum and difference signals for both azimuth and elevation and, using the above-described monopulse techniques, generates radar returns with both the range and angle of arrival. For a two-dimensional monopulse array in the concept described herein, these returns have range and both azimuth and elevation angles.

For the ground mode of operation, the ground/in-air clutter filter 62 removes returns that appear to come from the ground by using the installed location, pointing angle and beam pattern of each radar antenna array segment and geometry. Each radar return that is located near the ground plane (using the range, elevation angle and azimuth angle to compute its location) is removed. Other clutter that may be removed include returns off the aircraft body, above-horizon returns, returns below a certain amplitude, returns with positive velocities, and many others. These radar return filtering functions are all enabled when range and angles of arrival are available in a wide field of view. The remaining radar returns are passed onto the control module 52 for characterization in order to produce collision warnings. Similarly, for in-air operation, ground returns, aircraft body returns, returns from the cloud layer and other in-air objects are removed. The ground/in-air clutter filter 62 requires both the radar configuration data and inertial navigation information, which are received by the control module 52 and then passed on to the ground/in-air clutter filter 62.

The system depicted in FIG. 7 further includes a user interface 28 configured to present object detection information in a form perceptible to a person operating a vehicle, such as aircraft 10 shown in FIG. 3. For example, the user interface 28 may be a cockpit display viewed by a pilot. The control module 52 is configured to perform operations comprising: (a) calculating a range of an object based on a time difference between transmission and reception; (b) calculating a first angle of arrival of the return signal from the object based on a ratio of a first difference signal (azimuth difference signal $\Delta_{AZ}$) and the sum signal ($\Sigma$); (c) calculating a second angle of arrival of the return signal from the object based on a ratio of a second difference signal (elevation difference signal $\Delta_{EL}$) and the sum signal ($\Sigma$); and (d) sending object detection information (including the range and the angular position of the object) to the user interface 28. In accordance with the embodiments disclosed herein, the first angle of arrival is an azimuth angle and the second angle of arrival is an elevation angle of the object relative to the vehicle (e.g., aircraft 10). In accordance with one proposed implementation, the user interface 28 is a display device configured to display the information regarding the range and angular position of the object in the form of a track (represented by a line on a display screen) of a potentially colliding object (represented by a symbol representing the object which moves on the display screen as the object and vehicle move relative to each other). In the alternative or in addition, a user interface may be provided in the form of a visual or aural annunciator which issues an operator-perceptible warning when the separation distance between the vehicle and the object (range to the object) becomes less than a specified safe distance.

Figure 8:
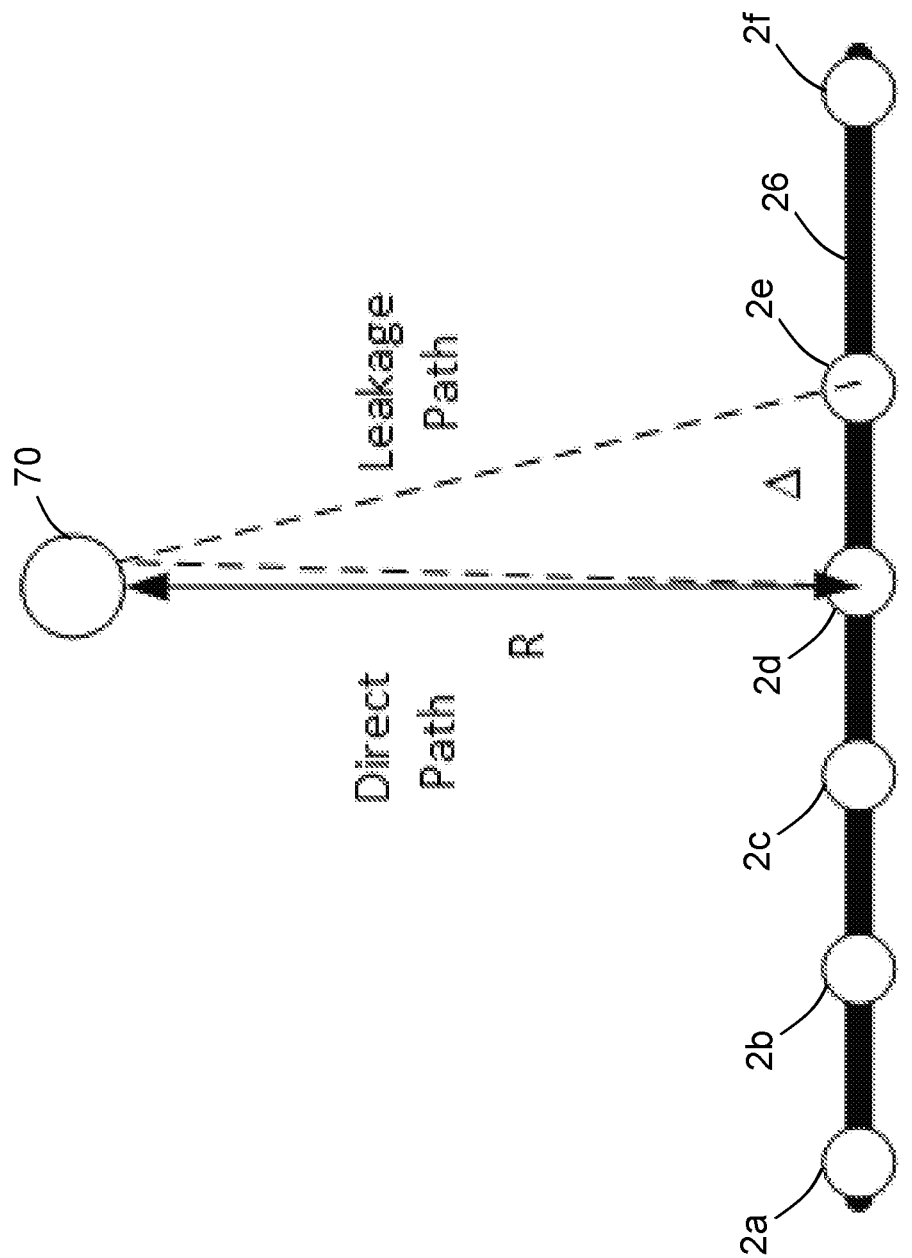
FIG. 8 is a diagram representing an array of monopulse radar antenna segments. The double-headed arrow indicates a direct path between one monopulse radar antenna segment and an object; the dashed lines indicate a leakage path to an adjacent monopulse radar antenna segment.

FIG. 8 is a diagram representing an array of first through sixth monopulse radar antenna segments 2a-2f mounted to a vehicle body 26. The double-headed arrow indicates a direct path between the fourth monopulse radar antenna segment 2d and an object 70; the dashed lines indicate a leakage path including the transmission from the fourth monopulse radar antenna segment 2d to the object 70 and the reflection or scattering from the object 70 to the fifth monopulse radar antenna segment 2e. The fourth and fifth monopulse radar antenna segments 2d and 2e are separated by a length $\Delta$.

The radar antenna array controller 50 inserts a known (and likely different) delay into each transmit IF signal sent to each radar antenna array segment 2 based on the radar antenna array segment's location. The delay ensures that each radar antenna array segment 2 transmits its pulse at the same time as every other radar antenna array segment. This ensures that the receive IF signal received on each radar antenna array segment 2 has leakage signals with similar ranges to the direct return signals. This is illustrated in FIG. 8, which shows that for a radar return of range R and radar antenna array segment separation of length $\Delta$, the apparent normalized range difference between the direct and leakage path is only $$\approx \frac{R + \sqrt{R^2 + \Delta^2} - 2R}{R} \approx \frac{\Delta^2}{2R^2}$$

using the Taylor expansion, whereas without delay compensation, it is $$\approx \Delta + \frac{\Delta^2}{2R^2}$$

This second delay is typically much greater than the first since R>>$\Delta$.

Figure 9:
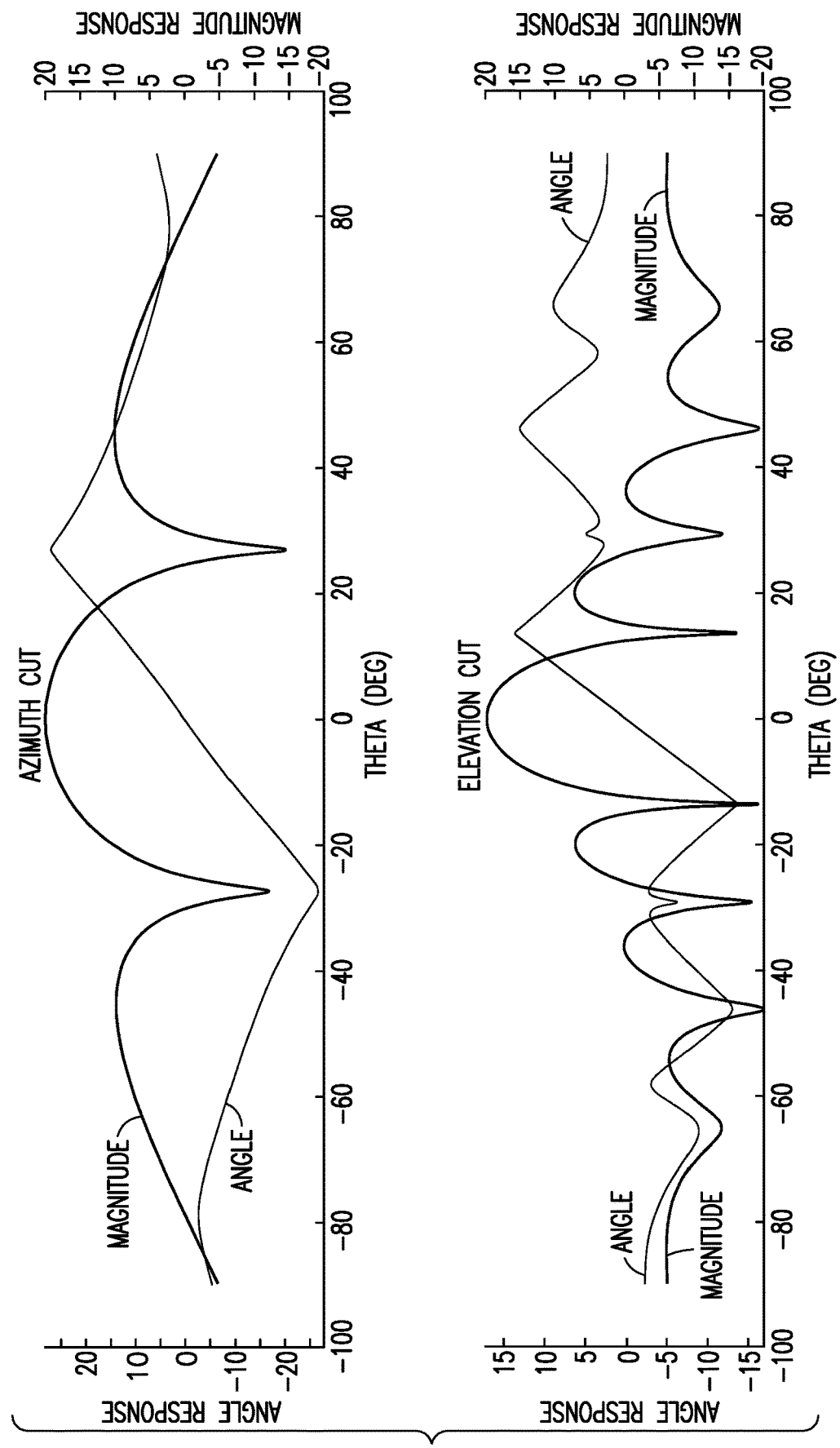
FIG. 9 includes two graphs showing example beam patterns for a monopulse antenna in azimuth and elevation in gain as well as normalized angle of arrival.

FIG. 9 includes two graphs showing example beam patterns for a monopulse antenna in azimuth and elevation in gain as well as normalized angle of arrival. As seen in FIG. 9, the sidelobe in the gain of the azimuth pattern is only ≈10 dB down from the main lobe. This will cause a great deal of "leakage" when a neighboring radar antenna array segment's transmitted pulse reflects into this radar antenna array segment's receiver.

Figure 10:
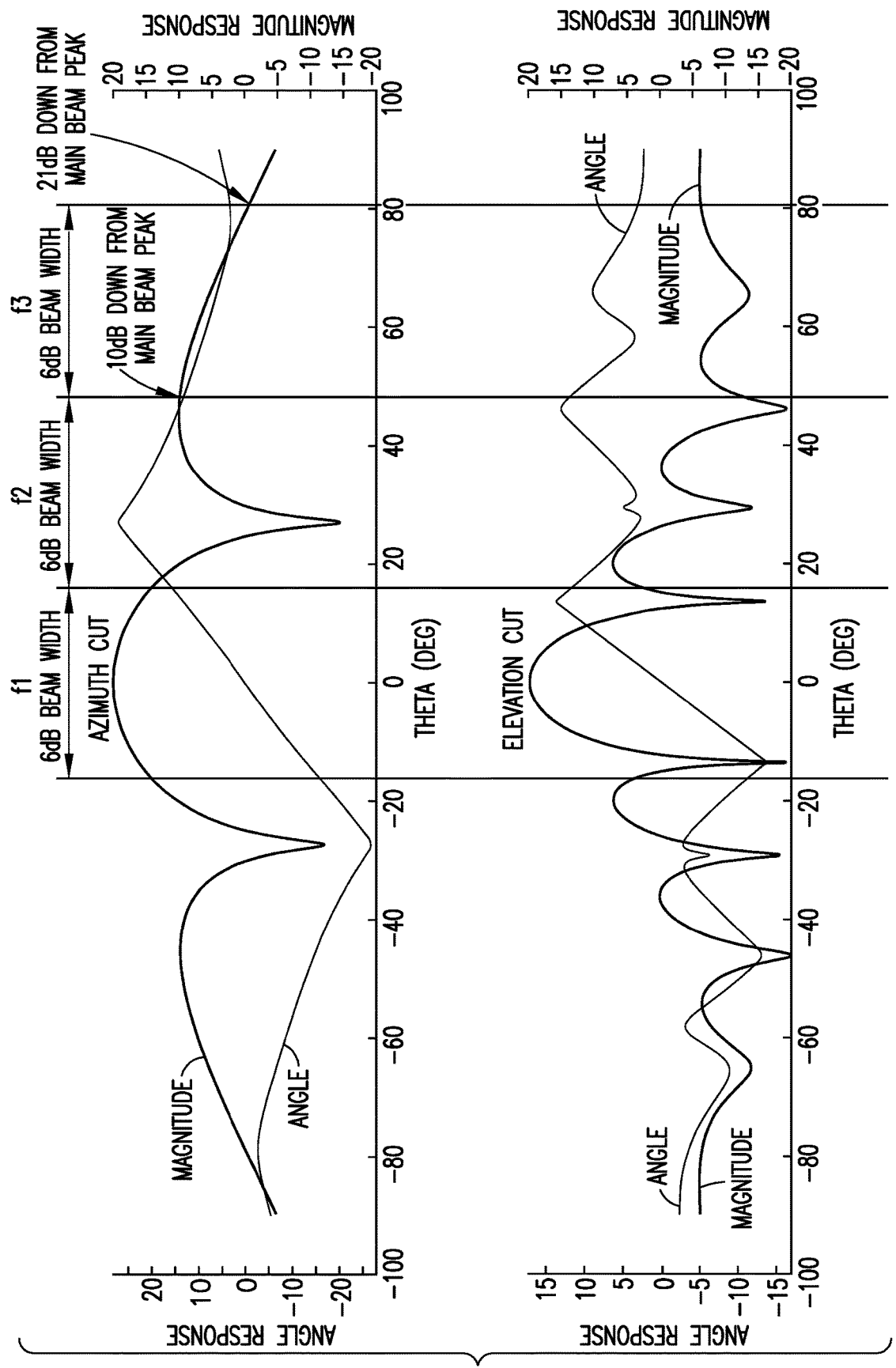
FIG. 10 includes two graphs showing how the example beam patterns of FIG. 9 would appear in three consecutive monopulse radar antenna segment when guard frequencies are used.

FIG. 10 includes two graphs showing how the example beam patterns of FIG. 9 would appear in three consecutive monopulse radar antenna segment when guard frequencies are used. As seen in FIG. 10, the drop in leakage even in the third radar antenna array segment is only down to 20 dB.

Figure 11:
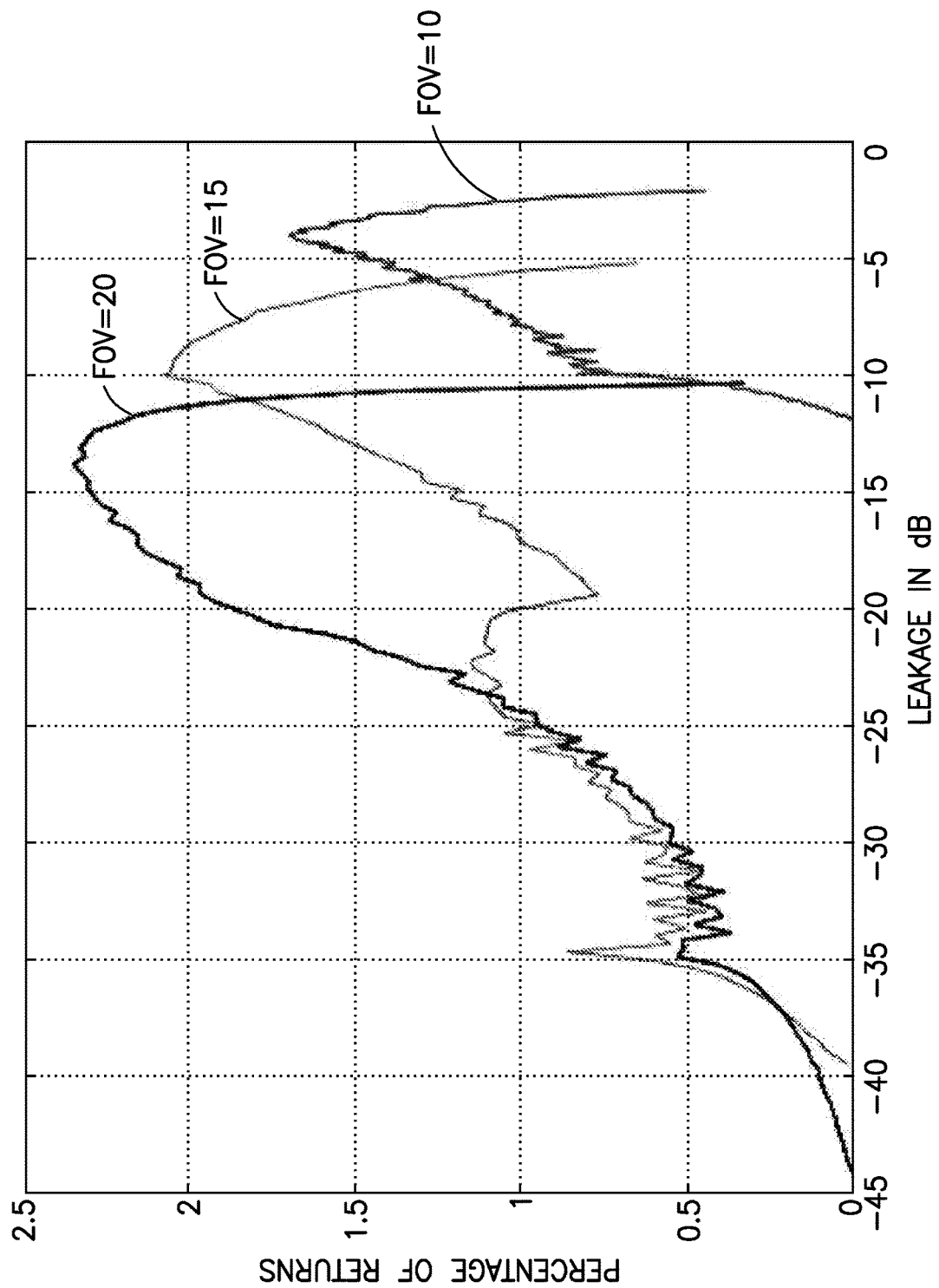
FIG. 11 is a graph showing a distribution of leakage to an adjacent monopulse radar antenna segment in a distributed monopulse radar antenna array for three example fields of view (FOV) measured in degrees.

FIG. 11 is a graph showing a distribution of leakage to an adjacent monopulse radar antenna segment in a distributed monopulse radar antenna array for three example fields of view (FOV) measured in degrees. In more detail, FIG. 11 shows the leakage effect for various choices of operating field of view of each radar antenna array segment where it is assumed that the reflection is lossless (this gives a picture of the maximum leakage). As seen in FIG. 11, a design choice in field of view allows for reducing the number of leakage returns in the desired field of view.

Figure 12A:
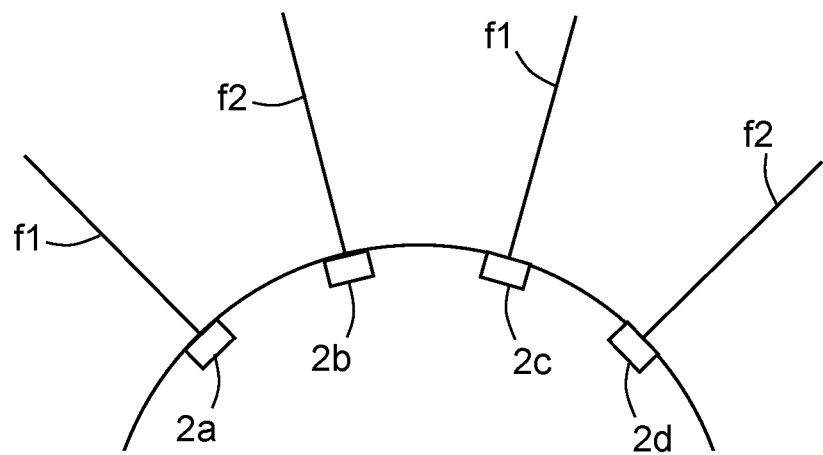
FIGS. 12A and 12B are diagrams showing example usage of two (FIG. 12A) and three (FIG. 12B) guard frequencies.
Figure 12B:
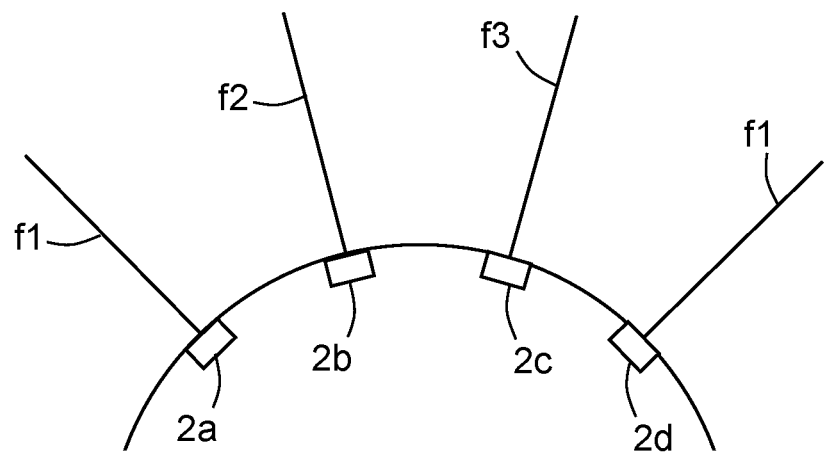

The solution to the leakage problem proposed herein is to use guard frequencies, such as alternating frequencies, on each radar antenna array segment 2. So for example, with a guard frequency $f_1$ that is 20 dB down in the frequency filter for guard frequency $f_2$, this would directly reduce the leakage by 20 dB. This alternation may be done with pairs of guard frequencies, or triples, or any other size. FIGS. 12A and 12B illustrate using two or three guard frequencies in this manner FIG. 12A shows a monopulse radar antenna array 1 in which pairs of adjacent segments respectively use first and second guard frequencies $f_1$ and $f_2$, where $f_1 \neq f_2$. More specifically, a first monopulse radar antenna segment 2a transmits at a first guard frequency $f_1$; a second monopulse radar antenna segment 2b adjacent to the first monopulse radar antenna segment 2a transmits at a second guard frequency $f_2$ which is different than the first guard frequency $f_1$; a third monopulse radar antenna segment 2c adjacent to the second monopulse radar antenna segment 2b transmits at the first guard frequency $f_1$; and a fourth monopulse radar antenna segment 2d adjacent to the third monopulse radar antenna segment 2c transmits at the second guard frequency $f_2$.

FIG. 12B shows a monopulse radar antenna array 1 in which trios of adjacent segments respectively use first, second, and third frequencies $f_1$, $f_2$, and $f_3$, where $f_1 \neq f_2 \neq f_3$. More specifically, a first monopulse radar antenna segment 2a transmits at a first guard frequency $f_1$; a second monopulse radar antenna segment 2b adjacent to the first monopulse radar antenna segment 2a transmits at a second guard frequency $f_2$ which is different than the first guard frequency $f_1$; a third monopulse radar antenna segment 2c adjacent to the second monopulse radar antenna segment 2b transmits at a third guard frequency $f_3$ which is different than the first and second guard frequencies; and a fourth monopulse radar antenna segment 2d adjacent to the third monopulse radar antenna segment 2c transmits at the first guard frequency $f_1$.

Also, when using such guard frequencies, the number of platforms that may be operated in one location is affected. Table 1 shows this effect and thus shows that the guard frequency list should be as short as necessary in order to keep the number of simultaneous operating radars as large as possible (c=speed of light; bw=bandwidth).

TABLE 1

| Transmitted Bandwidth | Range Resolution (c/bw/2) | Guard Frequencies | Simultaneous Platforms Supported |
|---|---|---|---|
| 10 MHz | 15 m | 2 | 250 |
| 10 MHz | 15 m | 3 | 166 |
| 50 MHz | 3 m | 2 | 50 |
| 50 MHz | 3 m | 3 | 33 |
| 100 MHz | 1.5 m | 2 | 25 |
| 100 MHz | 1.5 m | 3 | 16 |
| 500 MHz | 0.3 m | 2 | 5 |
| 500 MHz | 0.3 m | 3 | 3 |

In summary, the distributed monopulse radar antenna array proposed herein provides a cost-effective solution for collision detection for both ground and air applications for platforms with a wide variety of sizes (large and small). The proposed distributed monopulse radar antenna array has the following important features:

- The monopulse antenna array can operate as a single radar system to detect collisions at any designated angle within its field of view.
- The monopulse antenna array can use different ground and in-air antennas on each radar antenna array segment to handle the different needs of each type of collision detection mode.
- The monopulse antenna array may be installed easily into existing platform holes/spaces that allow radar transmission and reception rather than being forced to be in certain locations.
- The monopulse antenna array can avoid mutual self-interference through the usage of guard frequencies.
- The monopulse antenna array has much reduced calibration requirements since the array operates incoherently.
- The monopulse antenna array may be made for less cost than traditional radar systems for large-field-of-view detection applications due to a common transmitter/receiver and control unit with very simple radar antenna array segments.
- The monopulse antenna array has no coverage gaps or latency issues that steerable systems would have.
- Monopulse elevation and azimuth detection allows for filtering out ground clutter when mounted far above ground as in many aircraft applications.

These provide overall benefits by creating a cost-effective complete solution to either a ground-based or in-air-based collision avoidance sensor system.

Certain systems, apparatus, applications or processes have been described herein as including a number of modules. A module may be a unit of distinct functionality that may be implemented in software, hardware, or combinations thereof, except for those modules which are preferably implemented as hardware or firmware to enable streaming calculations as disclosed herein. When the functionality of a module is performed in any part through software, the module can include a non-transitory tangible computer-readable storage medium.

While systems and methods for detecting objects using non-coherent monopulse radar for collision avoidance have been described with reference to various embodiments, it will be understood by those skilled in the art that various changes may be made and equivalents may be substituted for elements thereof without departing from the teachings herein. In addition, many modifications may be made to adapt the concepts and reductions to practice disclosed herein to a particular situation. Accordingly, it is intended that the subject matter covered by the claims not be limited to the disclosed embodiments.

The embodiments of a controller disclosed above use one or more signal or data processing devices. Such devices typically include a processor or a computing device, such as a general-purpose central processing unit, a microcontroller, a reduced instruction set computer processor, an application-specific integrated circuit, a programmable logic circuit, a field-programmable gate array, a digital signal processor, and/or any other circuit or processing device capable of executing the functions described herein. The methods described herein may be encoded as executable instructions embodied in a non-transitory tangible computer-readable storage medium, including, without limitation, a storage device and/or a memory device. Such instructions, when executed by a processing device, cause the processing device to perform at least a portion of the methods described herein. The above examples are exemplary only, and thus are not intended to limit in any way the ordinary definitions and/or meanings of the terms "processor" and "computing device".

The invention claimed is:

1. A collision avoidance system for a vehicle comprising:
    a monopulse radar antenna array mounted to the vehicle and comprising a plurality of monopulse radar antenna segments having respective fixed fields of view, wherein each monopulse radar antenna segment comprises a comparator network configured to form a sum signal representing a summation of return signals received by the monopulse radar antenna segment and to form a first difference signal representing a first difference of the return signals received by the monopulse radar antenna segment;
    a user interface configured to present information in a form perceptible to a person operating the vehicle; and
    a radar antenna array controller electrically connected to the plurality of monopulse radar antenna segments and to the user interface and configured to perform operations comprising:
    calculating a range of an object based on a time difference between a time of transmission of a radar pulse and a time of reception of the return signals by a first monopulse radar antenna segment of the plurality of monopulse radar antenna segments;
    calculating a first angle of arrival of the return signal from the object based on a ratio of the first difference signal and the sum signal formed by the comparator network of the first monopulse radar antenna segment; and sending information regarding the range and an angular position of the object to the user interface.

2. The collision avoidance system as recited in claim 1, wherein:
the comparator network of the first monopulse radar antenna segment is further configured to form a second difference signal representing a second difference of the return signals received by the first monopulse radar antenna segment;
the radar antenna array controller is further configured to perform operations comprising calculating a second angle of arrival of the return signal from the object based on a ratio of the second difference signal and the sum signal formed by the comparator network of the first monopulse radar antenna segment; and
the first angle of arrival is an azimuth angle and the second angle of arrival is an elevation angle of the object relative to the vehicle.

3. The collision avoidance system as recited in claim 1, wherein each of the monopulse radar antenna segments includes a transmit antenna and a receive antenna.

4. The collision avoidance system as recited in claim 1, wherein the radar antenna array controller is further configured to control synchronous transmission by the monopulse radar antenna segments.

5. The collision avoidance system as recited in claim 4, wherein the radar antenna array controller is further configured to insert delays into transmit signals sent to the monopulse radar antenna segments, which delays are based on respective locations of the monopulse radar antenna segments.

6. The collision avoidance system as recited in claim 1, wherein the user interface is a display device configured to display the information regarding the range and angular position of the object.

7. The collision avoidance system as recited in claim 1, wherein field of views of adjacent monopulse radar antenna segments partially overlap.

8. The collision avoidance system of claim 1, wherein the first monopulse radar antenna segment transmits at a first guard frequency and a second monopulse radar antenna segment adjacent to the first monopulse radar antenna segment transmits at a second guard frequency which is different than the first guard frequency.

9. The collision avoidance system of claim 1, wherein the monopulse radar antenna array is mounted to a wing tip of an aircraft.

10. The collision avoidance system of claim 9, wherein a field of view of the monopulse radar antenna array has an azimuth angle of at least 240 degrees.

11. The collision avoidance system of claim 1, wherein the monopulse radar antenna array is mounted in a window hole of an aircraft.

12. A method for detecting an object comprising:
synchronously transmitting respective pulses from a plurality of monopulse radar antenna segments mounted to a vehicle with respective fields of view;
receiving return signals from an object at a first monopulse radar antenna segment of the plurality of monopulse radar antenna segments following synchronous transmission;
converting the return signals into a sum signal and a first difference signal;
processing the sum signal and first difference signal to estimate a first angle of arrival of the return signals;
determining a range of the object based on a time difference between a time of transmission and a time of reception by the first monopulse radar antenna segment; and
displaying symbology indicating the range and angular position of the object relative to the vehicle.

13. The method as recited in claim 12, further comprising:
converting the return signals into a second difference signal; and
processing the sum signal and second difference signal to estimate a second angle of arrival of the return signals,
wherein the first angle of arrival is an azimuth angle and the second angle of arrival is an elevation angle of the object relative to the vehicle.

14. The method as recited in claim 12, wherein the symbology indicates successive ranges and angular positions of the object.

15. The method as recited in claim 12, wherein synchronously transmitting respective pulses from the plurality of monopulse radar antenna segments comprises transmitting a pulse having a first guard frequency from the first monopulse radar antenna segment and transmitting a pulse having a second guard frequency which is different than the first guard frequency from a second radar antenna segment which is adjacent to the first radar antenna segment.

16. The method as recited in claim 12, wherein the vehicle is an aircraft.

17. An aircraft comprising:
a plurality of monopulse radar antenna segments having respective fixed fields of view and arranged to form a monopulse radar antenna array having a total field of view, wherein each monopulse radar antenna segment comprises a comparator network configured to form a sum signal representing a summation of return signals received by the monopulse radar antenna segment and form a first difference signal representing a first difference of the return signals received by the monopulse radar antenna segment;
a user interface configured to present information in a form perceptible to a pilot operating the aircraft; and
a radar antenna array controller electrically connected to the plurality of monopulse radar antenna segments and to the user interface and configured to perform operations comprising:
calculating a range of an object based on a time difference between a time of transmission of a radar pulse and a time of reception of the return signals by a first monopulse radar antenna segment of the plurality of monopulse radar antenna segments;
calculating a first angle of arrival of the return signal from the object based on a ratio of the first difference signal and the sum signal; and
sending information regarding the range and the angular position of the object to the user interface.

18. The aircraft as recited in claim 17, wherein:
the comparator network is further configured to form a second difference signal representing a second difference of the return signals received by the first monopulse radar antenna segment;
the radar antenna array controller is further configured to perform operations comprising calculating a second angle of arrival of the return signal from the object based on a ratio of the second difference signal and the sum signal; and
the first angle of arrival is an azimuth angle and the second angle of arrival is an elevation angle of the object relative to the aircraft.

19. The aircraft as recited in claim 17, further comprising a fuselage and a wing extending laterally from the fuselage, wherein the wing comprises a wing tip and the monopulse radar antenna array is mounted to the wing tip.

20. The aircraft as recited in claim 17, further comprising a fuselage, wherein the fuselage comprises a window hole and the monopulse radar antenna array is mounted to the window hole.

* * * * *